United States Patent
Carlisle et al.

(12)
(10) Patent No.: US 6,234,685 B1
(45) Date of Patent: May 22, 2001

(54) QUICK CONNECT FIBER OPTIC CONNECTOR HAVING A DEFORMABLE BARREL

(75) Inventors: Arthur Wallace Carlisle, Dunwoody; Jeffrey H. Hicks, Lilburn; John L. Siereveld, Marietta; William A. Vicory; Williard C. White, III, both of Suwanee, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/311,483

(22) Filed: May 13, 1999

(51) Int. Cl.⁷ .............................. G02B 6/00; G02B 6/36; G02B 6/255
(52) U.S. Cl. .............................................. 385/83
(58) Field of Search .................... 385/80–90, 147

(56) References Cited

U.S. PATENT DOCUMENTS

| 5,261,019 | * | 11/1993 | Beard et al. | 385/60 |
| 5,293,582 | * | 3/1994 | Beard et al. | 385/78 |
| 5,768,455 | * | 6/1998 | Konik | 385/80 |
| 6,000,858 | * | 12/1999 | Bloom | 385/94 |

* cited by examiner

*Primary Examiner*—Akm E. Ullah
(74) *Attorney, Agent, or Firm*—Thomas, Kayden, Horstemeyer & Risley, LLP

(57) ABSTRACT

The present invention provides a fiber optic connector and a method for installing a fiber optic connector including a barrel assembly disposed within a housing. The barrel assembly includes a barrel being formed of deformable material and having a barrel body and a barrel extension extending from an end of the barrel body. An opposing end of the barrel body supports a ferrule having a pre-polished fiber stub disposed therein. An insert is disposed within the barrel, the insert being deformable and is arranged and configured to receive at least one fiber. An extender cap engages a portion of the housing fixing the barrel assembly within the housing. The housing includes at least one aperture disposed in a side portion for accessing the barrel assembly.

In one aspect of the invention a method for installing a fiber optic connector is provided including the steps of, first, forming a barrel assembly. The barrel assembly is then placed in the housing and an extender cap disposed on a protruding portion of the barrel to fix the barrel assembly in the housing. Finally, a fiber is inserted into the barrel until the fiber contacts the fiber stub and the fiber is crimped into the insert.

21 Claims, 6 Drawing Sheets

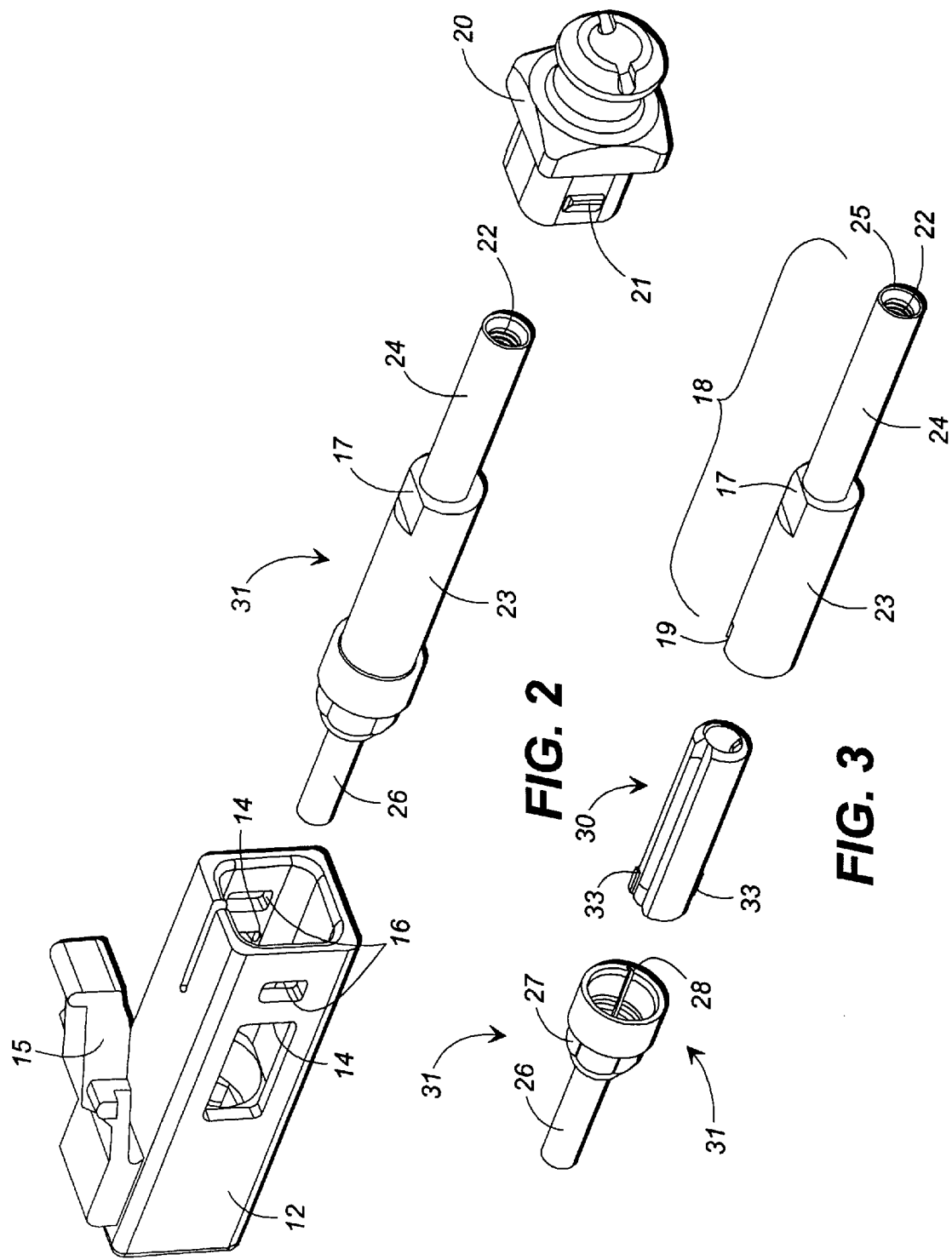

QUICK CONNECT FIBER OPTIC CONNECTOR HAVING A DEFORMABLE BARREL

BACKGROUND OF THE INVENTION

The present invention relates generally to a connector for fiber optic cable, and, more particularly, to a fiber optic connector that can be readily installed in the field without the need for epoxy or anaerobic adhesives.

Optical fiber connectors and splices are an essential part of optical fiber communications systems. Connectors may be used to join lengths of optical fiber into longer lengths, or to connect optical fiber to active devices such as radiation sources, detectors, repeaters, or to passive devices such as switches or attenuators.

Many prior art connectors use adhesives or epoxies in securing connector components. For example, a typical connector includes a ferrule piece rigidly attached to a connector body. Adhesive is injected into a longitudinal bore of the ferrule. A cable is received into the connector body with the stripped fiber projecting along the longitudinal bore of the ferrule and is cemented therein by the adhesive. This adhesive typically must be heat cured. As such, heat curing ovens are needed in the field where the connectors are being installed and a source of power for the ovens must be available. The adhesive wicks and adheres to the fiber, the ferrule, the connector body, and other connector parts to permanently secure the connector components to one another.

Other known connectors include quick-connect type designs having a fiber stub disposed within the connector and a grooved insert for splicing fiber ends. One known design includes a split cylinder with an expanded metal split sleeve which is spread open by a pair of wires. Removal of the wires collapses the sleeve over two non-compliant inserts to capture the fibers. Another approach uses a cam ring to compress two non-compliant inserts. While these approaches seem to work well with larger connectors, such as the ST and SC, due to the physical size of the internal components, the design does not appear to be compatible with smaller connectors, such as the LC.

There is a growing demand for a fiber optic connector of smaller size that is simple to install or assemble in a field setting. In particular, where single connectors are installed such as at a wall outlet, there is a growing resistance to the use of epoxies that require special heat-curing ovens to facilitate solidification, and, in general, to the use of chemicals such as anaerobic adhesives.

Accordingly, what is sought is a fiber optic connector that can be easily installed or assembled without the use of epoxies, adhesives, or polishing. Thereby, eliminating the time and tools needed to heat cure adhesives and polish fibers in the field.

SUMMARY OF THE INVENTION

Certain advantages and novel features of the invention will be set forth in the description that follows and will become apparent to those skilled in the art upon examination of the following or may be learned with the practice of the invention.

The present invention is generally directed to a fiber optic connector that can be installed in the field without the use of any adhesive or epoxy, or the need to polish the fiber in the field. The connector includes a housing with a barrel, having a malleable portion, disposed therein. The barrel is formed as a unitary piece having two portions, a barrel body and a barrel extension, axially aligned with one another. A ferrule supporting a fiber stub is disposed on an end of the barrel body opposing the barrel extension such that the fiber stub extends into the barrel body. A two-part insert, comprising a compliant portion and a support portion, is arranged and configured within the barrel body to receive the fiber stub supported by the ferrule and a field inserted fiber. The support portion of the insert includes a groove to position and align the fibers. The compliant portion of the insert acts as a load transfer member when the barrel is compressed. The housing includes an aperture through which the barrel is accessible.

The invention can be viewed as providing a method for installing a fiber optic connector without using adhesives or requiring polishing in the field. In this regard, the method can be broadly summarized by the following steps. A preferred two part insert having a compliant portion and a support portion is inserted into a deformable barrel. A ferrule containing a pre-polished fiber stub is press-fitted to the barrel with the fiber stub extending partially into the insert. The barrel, including the insert and fiber stub ferrule, is disposed in a housing. The housing includes at least one aperture disposed therein such that the barrel is accessible through the aperture. A fiber is inserted into the insert via the barrel until the fiber contacts the fiber stub. Finally, the barrel can be contacted by any suitable member that can access the barrel through the aperture disposed in the housing. The barrel is preferably supported adjacent the support portion while a portion of the barrel adjacent the compliant portion is deformed. Pressure is applied to the barrel and the barrel deformed until the compliant portion deforms to trap the field inserted fiber and the fiber stub in the groove of the rigid insert. Preferably, but not necessarily simultaneously, a portion of the barrel extension extending beyond the housing is contacted by another portion of the tool and deformed to grip the buffered fiber therein.

Advantageously, a technician can join and secure the optical fibers in the insert and the barrel to the fiber buffer. Thereby, the optical fiber can be connected to a pre-polished fiber stub fixed within the barrel insert. Thus, the connector can be installed on an optical fiber in the field without the use of adhesive or epoxy or field polishing.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is an exploded perspective view of the fiber optic connector of FIG. 1;

FIG. 3 is an exploded perspective view of a barrel assembly of the fiber optic connector shown in FIG. 1;

DETAILED DESCRIPTION OF THE PREFERRED EMBODIMENT

Figure 1:
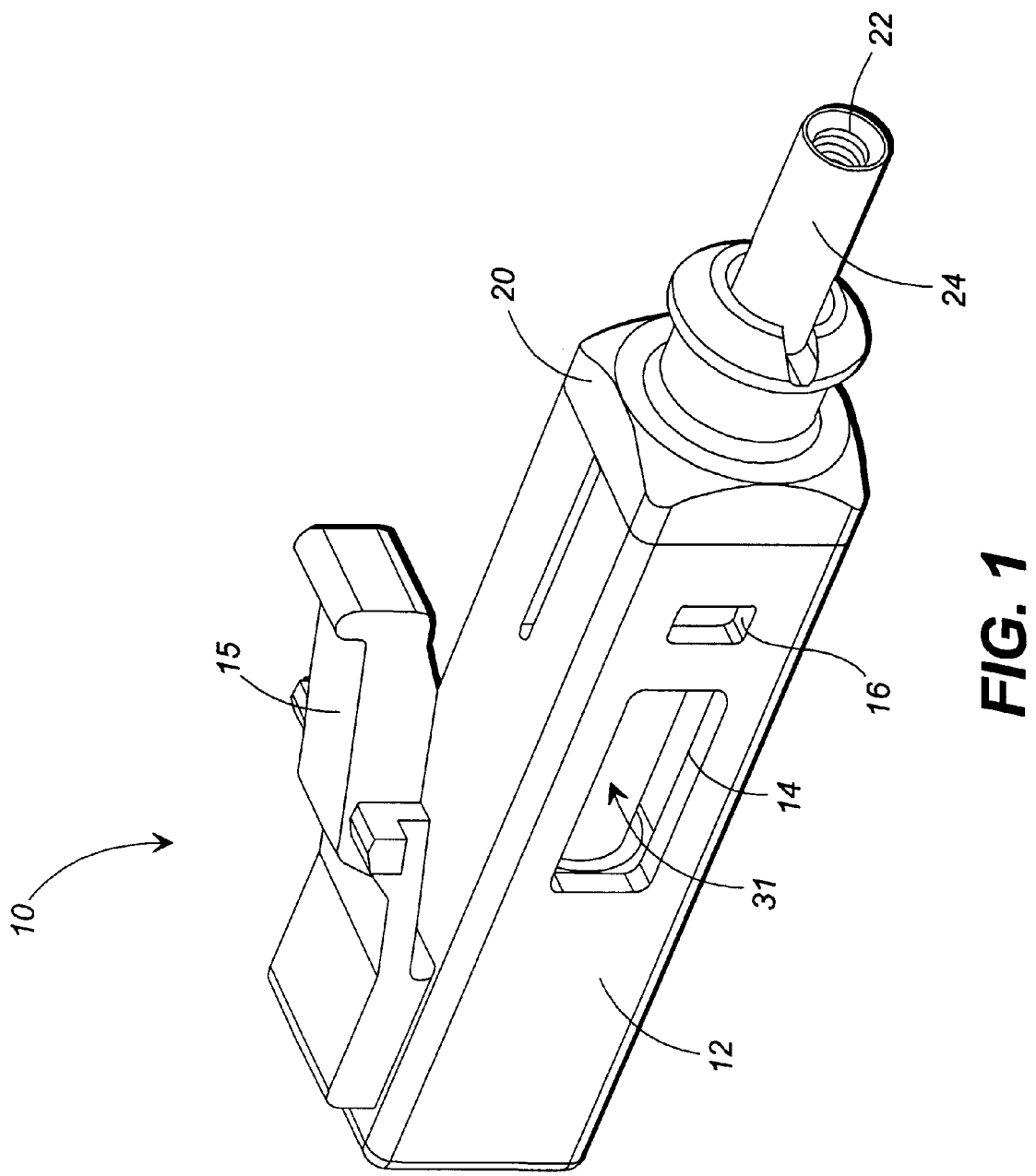
FIG. 1 is a perspective view of a fiber optic connector, embodying the principles of the invention.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

The quick-connect fiber optic connector 10 of the present invention can be easily installed in a field setting without using epoxies or adhesives, or requiring field polishing is shown in FIGS. 1 and 2. The connector 10 according to the present invention is embodied in an LC-type connector. It should be appreciated that the principles of the invention disclosed herein can be applied to other known optical connectors, such as, for example, ST, SC, and FC varieties, and that the choice of an LC-type connector for the preferred embodiment is for illustrative purposes only. Although this version of the connector is intended for attachment to buffered fiber, the design can be readily extended to jacketed-type fiber. The connector 10 includes a housing 12 having disposed therein a barrel assembly 31 and an extender cap 20 extending from one end of the housing 12. The exterior of the housing 12 preferably includes a latch arm 15 to facilitate mating of connector 10 with a complimentary connector or receptacle. As shown in FIG. 2, the housing 12 further includes a pair of apertures 14—14 disposed in each side thereof to provide access to the interior of the connector 10 and the barrel assembly 31 when disposed therein. Additionally, a pair of apertures 16—16 are also formed in the sides of the housing 12 which are arranged and configured to engage a pair snap flanges 21—21 (only one of which is shown) formed on the sides of the extender cap 20, thereby holding the extender cap 20 in position and the barrel assembly 31 securely within the housing 12.

FIG. 3 provides a prospective view of the components of the barrel assembly 31. The barrel assembly 31 comprises a barrel 18 preferably of one unitary piece having two portions, a barrel body 23 and a barrel extension 24. The barrel body 23 and the barrel extension 24 are preferably formed of differing diameters (the barrel body 23 having a larger diameter than the barrel extension 24) and are axially aligned to each other. The barrel body 23 is configured to support a fiber stub ferrule 26 at one end, which is press-fitted thereto, and has the barrel extension 24 extending from the opposite end of the barrel body 23. Formed at the end of the barrel body 23 and configured to support the fiber stub ferrule 26, are a pair of orientation recesses 19—19 (only one of which is shown) for orienting the insert 30 therein. The opposing end of the barrel body 23 includes an orientation flat 17 for orientation of the barrel assembly 31 within the housing 12. Interior to the barrel 18, the barrel body 23 is arranged and configured to receive the insert 30 (described hereinafter in more detail) and the barrel extension 24 includes a threaded portion 22 for gripping the buffer of a fiber inserted therein through the open end 25 of the barrel extension 24, which is configured to receive a fiber inserted in the field. The barrel 18 can comprise a soft fully-annealed aluminum or any suitable material that allows for deformation upon a force being applied directly thereto.

The fiber stub ferrule 26 includes a fiber stub 28 supported therein. The fiber stub 28 is polished prior to positioning within the ferrule 26. The ferrule 26 includes a hex coupling 27 configured to engage a comparable hex coupling (not shown) formed on the interior of the housing 12, thereby aligning and orienting the barrel assembly 31 within the housing 12. Therefore, an inserted fiber can be centered within the connector 10 and the barrel 18 will not rotate within the housing 12. Further, the orientation of the barrel assembly 31 within the housing 12 is essential to ensure that the support portion 32 as seen in FIG. 6, for example, of the insert is adjacent one of the apertures 14 of the housing 12, and that the compliant portion 34 is adjacent the other of the apertures 14 of the housing 12.

Figure 4:
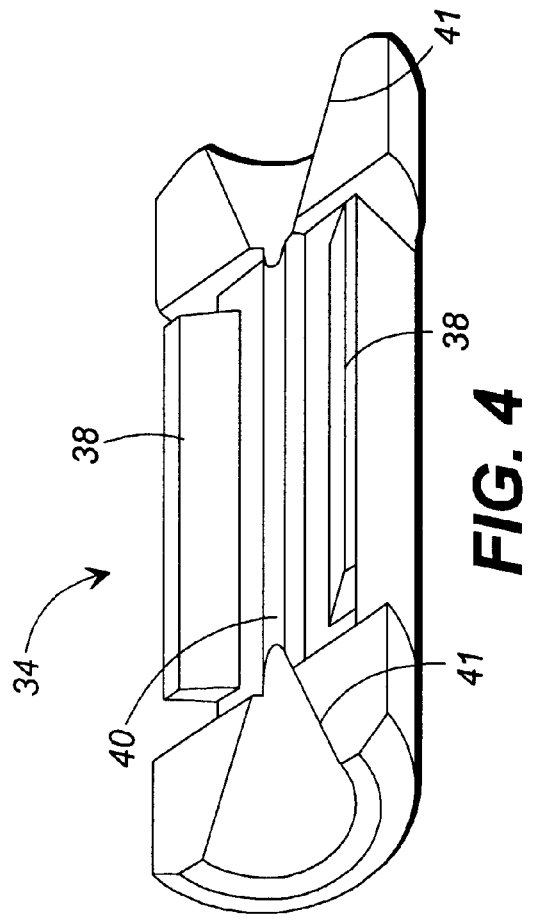
FIG. 4 is a perspective view of a compliant portion of the insert of FIG. 3.
Figure 5:
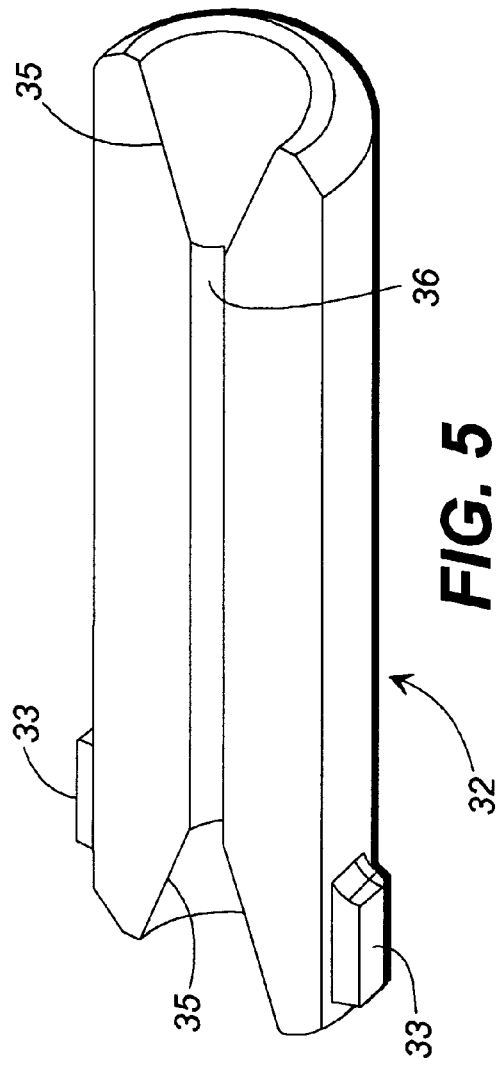
FIG. 5 is a perspective view of a support portion of the insert of FIG. 3.

FIGS. 4 and 5 illustrate the two preferred portions of the insert 30. Specifically, FIG. 4 illustrates the compliant portion 34 of the insert 30 and FIG. 5 illustrates the support portion 32 of the insert. Looking first at FIG. 4, the compliant portion 34 includes a pair of flanges 38—38 and a contact rail 40 therebetween. At both ends, the compliant portion 34 includes angled or tapered access portions 41—41. The compliant portion 34 is preferably injection molded and formed of a material having properties that provide for a readily deformable insert having low flow properties. The compliant portion 34 must also be resilient such that the compliant portion 34 substantially corresponds to the barrel 18 during compression of the barrel 18 and after the force is removed.

Turning now to FIG. 5, the support portion 32 of the insert 30 includes a pair of orientation flanges 33—33 to be engaged by the pair of orientation recesses 19—19 (FIG. 3) disposed at one end of the barrel body 23 for orienting the insert 30 within the barrel assembly 31. The support portion 32 further includes a capillary or groove 36 disposed longitudinally and preferably centered on the portion 32 and extending the full length of the portion 32. The groove 36 is arranged and configured to receive both the fiber stub 28 and a field inserted fiber. Although a groove 36 in the shape of "V" having a 90 degree angle and having a depth such that the top of the fiber stub 28 and the inserted fiber are substantially flush with the plane of the surfaces on either side of the groove 36, provides a preferable arrangement, it should be understood that any capillary or groove capable of supporting fibers is suitable. Both ends of the support portion 32 also include an angled access portion 35—35. These access portions 35—35, however, are preferably at an angle (for example 30 degrees) that is relatively greater than the angle of the access portions 41—41 (for example 20 degrees) of the compliant insert 34 (FIG. 4). When the insert 30 is assembled, the angled access portions 35—35 of the support portion 32 together with the angled access portions 41—41 of the compliant portion 34 provide for a fully enclosed entry cone for the field inserted fiber thereby cutting down on fiber misplacement during insertion of a fiber into the connector 10. The offsetting of the angled portions 35—35 of the support portion 32 from the angled portions 41—41 of the compliant portion 34 provides a tolerance for deformation of the entry cone without damaging the field inserted fiber when the compliant portion 34 is deformed to fix the fibers in the groove 36. The support portion 32 is preferably injection molded and formed of a substantially rigid plastic material that resists deformation when a force is applied to the barrel 18 within which the insert 30 is contained.

Figure 6:
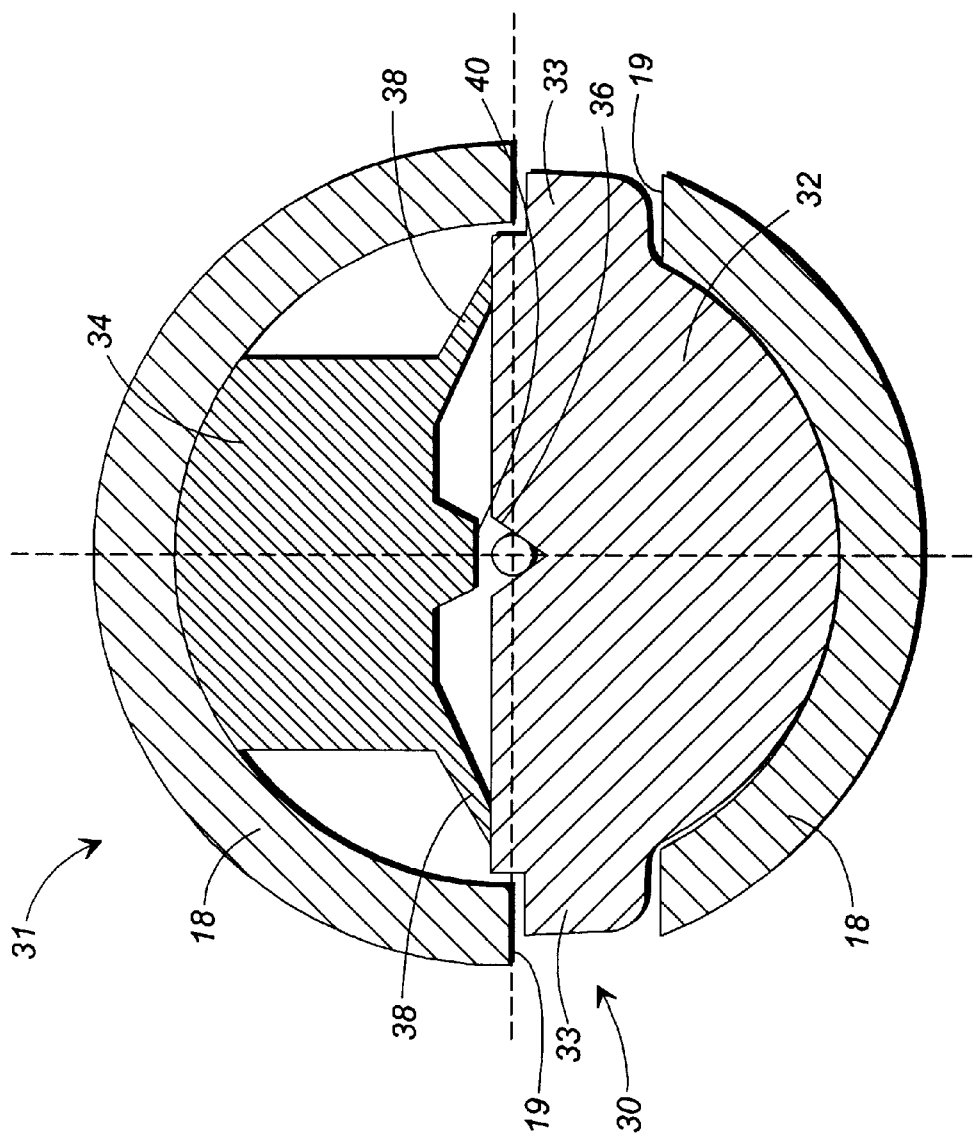
FIG. 6 is a cross sectional view of a barrel assembly of the fiber optic connector FIG. 1.

A cross-section of the barrel assembly 31 is illustrated in FIG. 6. The insert 30 comprising the support portion 32 and the compliant portion 34 is disposed within the barrel 18, more specifically, the barrel body 23 portion of the barrel 18. The insert 30 is arranged within the barrel 18 such that the orientation flanges 33—33 of the support portion 32 engage the orientation recesses 19—19 of the barrel 18, the groove 36 is substantially centered within the barrel 18, and a portion of the support portion 32 opposing the groove 36 is flush with an interior surface of the barrel 18. The compliant portion 34 of the insert 30 is arranged and configured such that the flanges 38—38 initially provide clearance between the contact rail 40 and the groove 36 to provide for easy insertion of a fiber in the groove 36. It is further preferable that the portion of the compliant insert 34 opposing the contact rail 40 is flush with an interior surface of the barrel 18.

Figure 7:
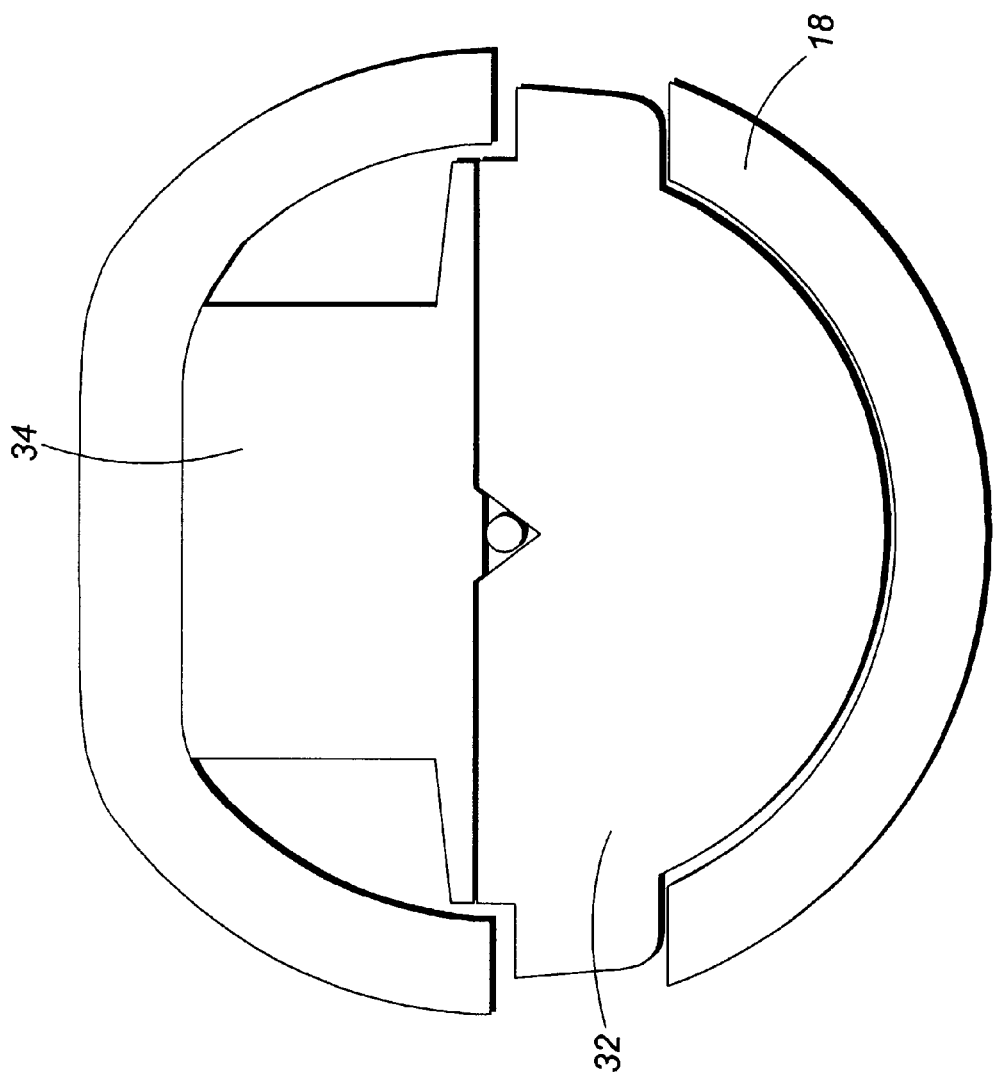
FIG. 7 is a cross sectional view of a barrel assembly of the fiber optic connector of FIG. 1 in the compressed position, as installed.

Referring now to FIG. 7, illustrated is a cross section of the barrel assembly 31 after a fiber has been inserted in the field to contact the fiber stub 28 and pressure has been applied to the barrel 18. The support portion 32 remains undeformed while the barrel 18 adjacent the compliant portion 34 is deformed thereby deforming the compliant portion 34. The compliant portion 34 is compressed and deformed toward the groove 36 and the flanges 38 are displaced outward, away from the groove 36 and toward the barrel 18. Once the connector 10 is assembled and a fiber is inserted into the connector 10, the groove 36 supports both the fiber stub 28 and a portion of the fiber inserted in the field. Upon the deformation of the insert 30, the contact rail 40 acts to crimp both the fiber stub 28 and an inserted fiber into the groove 36 and in contact with each other.

Figure 6A:
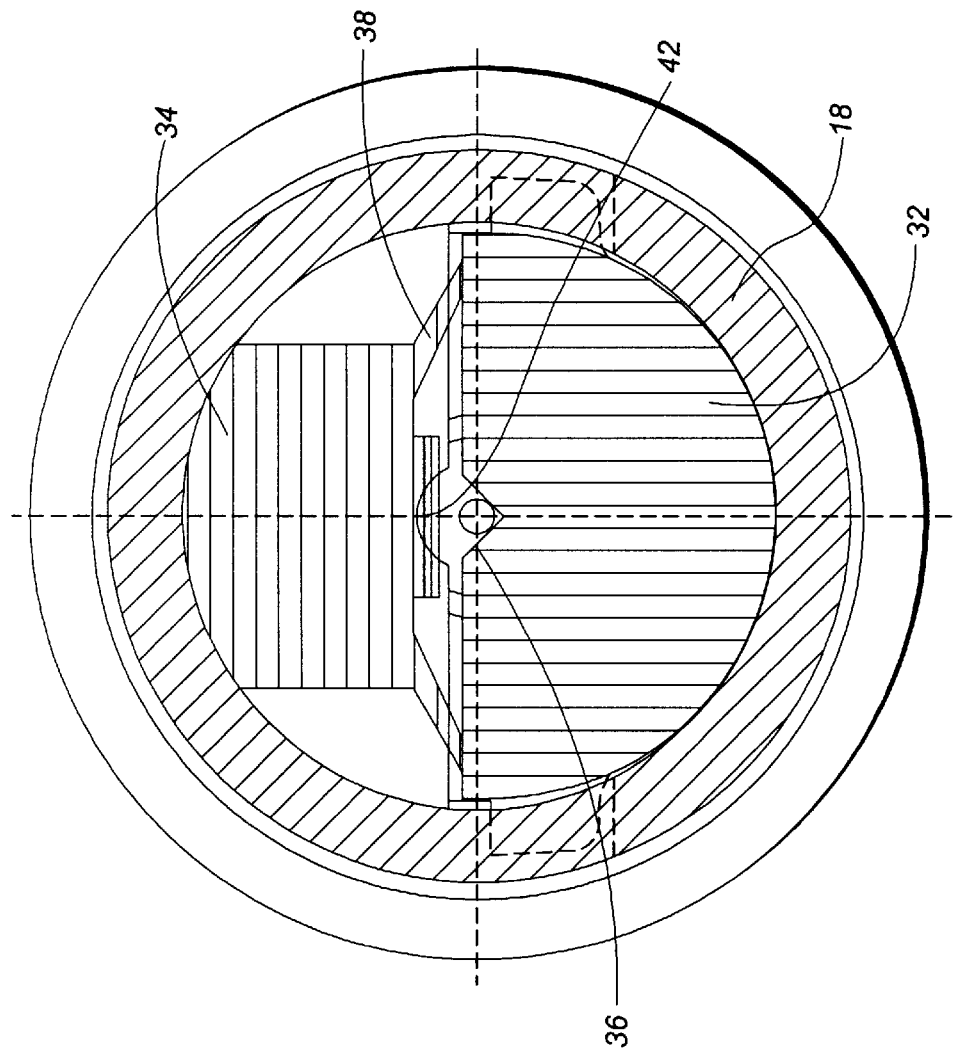
FIG. 6a is an alternative embodiment of the barrel assembly of the fiber optic connector of FIG. 1.

FIG. 6a illustrates an alternative embodiment of the insert 30 as disposed within a barrel 18. This alternative embodiment of the insert 30 includes a similar two-part configuration having a support portion 32 and a compliant portion 34 which are oriented in a similar fashion to that described regarding FIG. 6. The compliant portion 34, however, includes a substantially rigid strip 42 bonded thereto. The rigid strip 42 is aligned with the groove 36 of the rigid portion 32 for transferring the load from the compliant portion 34 to the field installed fiber and the fiber stub 28 in the groove 36.

In use, a portion of the connector 10 is assembled in a factory or pre-manufactured. The fiber stub 28 is prepolished and inserted into the fiber stub ferrule 26. The insert 30 is positioned within the barrel 18 and the fiber stub ferrule 26 is disposed on the barrel 18 such that the fiber stub 28 extends into the groove 36 of the insert 30 to form the barrel assembly 31. The barrel assembly 31 is inserted and oriented in the housing 12 using the barrel orientation flat 17. The extender cap 20 is disposed on the barrel extension 24 and "snapped" into place, using the snap flanges 21—21 on the extender cap 20 and the apertures 14—14 on the housing 12, to hold the barrel assembly 31 in the housing 12. During manufacturing a drop of index matching gel can be inserted in the connector to minimize loss at the splicing point between the field inserted fiber and the fiber stub 28. Dust caps (not shown) can be press-fitted on both ends of the connector 10 to keep the interior of the connector 10, including the index matching gel, clean during shipping. In the field, a buffered fiber can be stripped, cleaved, and inserted into the open end 25 of the barrel 18. The entry cone formed by the angled portions 41—41 of the compliant portion 34 and the angled portions 35—35 of the rigid portion 32 guides the field inserted fiber into the insert 30. The groove 36 of the support portion 32 of the insert 30 aligns the field inserted fiber with the fiber stub 28. A tool can then be used to, preferably simultaneously, engage the barrel 18 through the aperture 14 disposed in the side of the housing 12 and to engage a portion of the barrel extension 24 extending beyond the extender cap 20. The tool preferably includes a shaped portion to support, without deforming, the barrel 18 adjacent the support portion 32 of the insert 30 and a flat portion for engaging the barrel 18 adjacent the compliant portion 34 of the insert 30. The tool is then operated to apply pressure to the barrel 18 and the barrel extension 24. Upon the application of such pressure, the barrel 18 deforms and engages the compliant portion 34 of the insert 30 causing the clearance flanges 38—38 to deform and spread away from the groove 36 until the contact portion 40 contacts the fibers thereby crimping the field inserted fiber and the fiber stub 38 into the groove 36 (as shown in FIG. 7). The threaded portion 22 interior to the barrel extension grips the field inserted buffered fiber extending therethrough upon deformation. Although a tool is referenced herein for crimping the fiber stub and fiber into position, it will be understood by those with ordinary skill in the art that any means of accessing the necessary portions of the connector to achieve crimping will be suitable.

The principles in the present invention can also be applied to connectors used with jumper cables that typically use an internal spring to provide an axial bias force for the ferrule and barrel components.

Although a preferred embodiment of the invention has been disclosed in detail herein, it will be obvious to those skilled in the art that variations and modifications of the disclosed embodiment can be made without departing from the spirit and scope of the invention as set forth in the claims.

We claim:

1. A fiber optic connector, comprising:
   a housing having at least one aperture formed therein;
   a barrel assembly being disposed in said housing, said barrel assembly having a deformable portion and having a fiber stub disposed therein; and
   an extender member, wherein said extender member is adapted to engage a portion of said housing to fix said barrel assembly within said housing;
   said barrel assembly being arranged and configured to receive a fiber therein such that the fiber contacts said fiber stub within said deformable portion of said barrel assembly to crimp the fiber and the fiber stub in abutting position within the barrel assembly.

2. The connector of claim 1, wherein said barrel assembly further comprises:
   a barrel having a barrel body and a barrel extension extending from said barrel body and being axially aligned thereto;
   an insert being disposed in said barrel body, said insert being deformable and arranged and configured to receive at least one fiber optic; and
   a ferrule supporting said fiber stub, said ferrule being disposed on an end of said barrel body opposing said barrel extension and positioned such that said fiber stub extends into said insert.

3. The connector of claim 2, wherein said barrel extension includes a threaded interior portion.

4. The connector of claim 2, further comprising:
   an barrel orientation flat disposed on said barrel body; and
   an orientation portion disposed in said housing configured to engage said barrel orientation flat for orienting said barrel within said housing.

5. The connector of claim 2, further comprising;
   a ferrule orientation hex disposed on said ferrule; and
   a housing orientation hex disposed within said housing, said housing orientation hex being arranged and configured to engage said ferrule orientation hex.

6. The connector of claim 2, wherein said insert further comprises:
   a support portion; and
   a compliant portion, said compliant portion being separate and distinct from said support portion.

7. The connector of claim 2, wherein said insert further comprises:
   an entry cone disposed in the interior of at least one end of said insert for guiding a fiber into said insert.

8. The connector of claim 6, wherein said support portion of said insert comprises a rigid material having a groove disposed longitudinally therein, wherein said groove is arranged and configured for supporting said fiber stub and for receiving a fiber optic and aligning the fiber optic with said fiber stub.

9. The connector of claim 6, wherein said compliant portion of said insert comprises a deformable material, said compliant portion having at least one flange and a contact rail for contacting an optic fiber supported by said support portion, said compliant portion being arranged and configured in said barrel such that said contact rail is aligned with a groove of said support portion, and said flange providing clearance between said groove and said contact rail.

10. The connector of claim 6, wherein said compliant portion and said support portion of said insert each include an angled access portion being adjacent each other in said insert, wherein said angled access portion of said compliant portion is less angled than said angled access portion of said support portion.

11. A method for assembling a fiber optic connector, comprising the steps of:
   forming a barrel assembly having an insert and a fiber stub disposed therein;
   placing said barrel assembly in a housing having at least one aperture formed therein providing access to said barrel assembly;
   disposing an extender cap on a protruding portion of said barrel assembly to fix said barrel assembly in said housing;
   inserting a fiber into said insert until said fiber contacts said fiber stub;
   contacting said barrel through said aperture in said housing; and
   deforming said barrel and said insert therein to fix said fiber and said fiber stub in said connector.

12. The method of claim 11, wherein said step of forming a barrel assembly further comprises the steps of:
   providing a barrel having a barrel body of a first diameter and a barrel extension of a second diameter being less than said first diameter, said barrel extension extending from one end of said barrel body and being axially aligned thereto;
   disposing said insert in said barrel body;
   placing said fiber stub in a ferrule; and
   disposing said ferrule on an end of said barrel body opposing said barrel extension such that said fiber stub extends into said insert.

13. The method of claim 11, further comprising the step of:
   providing index matching gel in said insert where said fiber contacts said fiber stub.

14. The method of claim 11, wherein said crimping includes the steps of:
   contacting the barrel through said aperture disposed in said housing; and
   applying pressure on said barrel such that a portion of said barrel deforms and said insert deforms to fix said fiber and said fiber stub in said insert.

15. The method of claim 11, wherein said insert includes a support portion having a groove disposed longitudinally therein and a compliant portion and further comprising the steps of:
   supporting said support portion; and
   applying pressure to a portion of said barrel such that said portion of said barrel and said compliant portion deform.

16. The method of claim 11, firther comprising the step of:
   contacting a portion of said barrel extending from said housing such that said second portion of said barrel crimps said fiber.

17. The method of claim 16, wherein said contacting said barrel through said aperture in said housing and contacting a portion of said barrel extending beyond said housing are performed simultaneously.

18. The method of claim 11, further comprising the step of:
   aligning said fiber stub and a fiber optic in said groove of said support portion.

19. A method for assembling a fiber optic connector, comprising the steps of:
   forming a barrel assembly having an insert and a fiber stub disposed therein;
   placing said barrel assembly in a housing having at least one aperture formed therein providing access to said barrel assembly; and
   disposing an extender cap on a protruding portion of said barrel assembly to fix said barrel assembly in said housing.

20. The method of claim 19, wherein said step of forming a barrel assembly further comprises the steps of:
   providing a barrel having a barrel body of a first diameter and a barrel extension of a second diameter being less than said first diameter, said barrel extension extending from one end of said barrel body and being axially aligned thereto;
   disposing said insert in said barrel body;
   placing said fiber stub in a ferrule; and
   disposing said ferrule on an end of said barrel body opposing said barrel extension such that said fiber stub extends into said insert.

21. The method of claim 20, further comprising the step of:
   providing index matching gel in said insert where a fiber can contact said fiber stub.

* * * * *